April 30, 1946.　　　　　P. SPENCE　　　　　2,399,301
VALVE
Original Filed Aug. 6, 1938
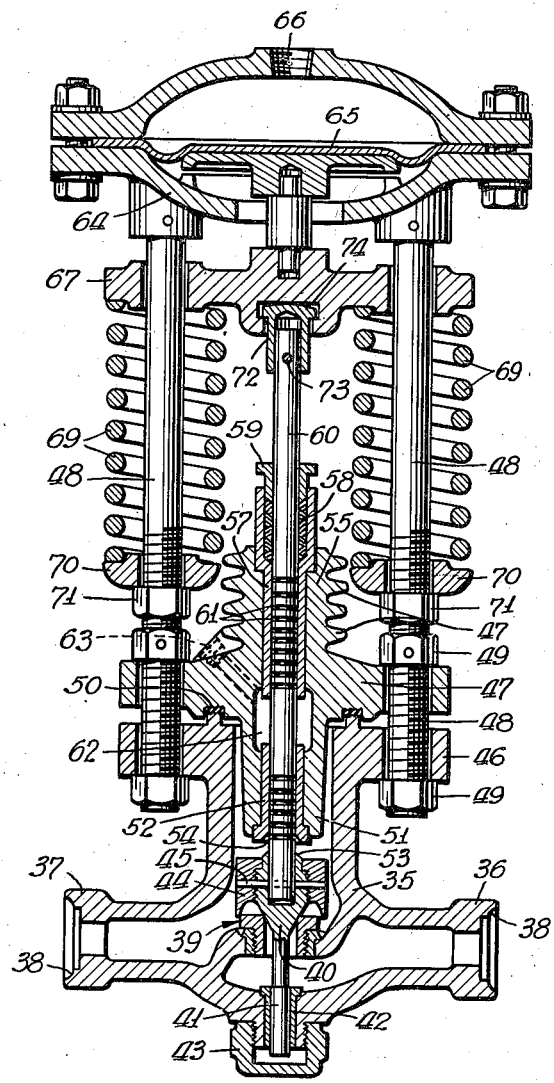
INVENTOR
Paulsen Spence
BY
Mitchum Bichart
ATTORNEY Patented Apr. 30, 1946

2,399,301

UNITED STATES PATENT OFFICE 2,399,301

VALVE

Paulsen Spence, East Orange, N. J., assignor to Spence Engineering Company, Inc., Walden, N. Y., a corporation of New York Original application August 6, 1938, Serial No. 223,444, now Patent No. 2,293,314, dated August 18, 1942. Divided and this application May 21, 1942, Serial No. 443,884

2 Claims. (Cl. 137—153)

My invention relates to a valve and this application is a division of my co-pending application, Serial No. 223,444, filed August 6, 1938, now Patent 2,293,314, August 18, 1942.

It is the general object of my invention to provide an improved form of valve, particularly a fluid pressure actuated valve for controlling the flow of high pressure or high temperature fluids.

In the drawing which shows, for illustrative purposes only, a preferred form of the invention—

The figure is a vertical, central sectional view of a valve embodying the invention.

The valve in its preferred form includes a steel body 35 having an inlet connection 36 and an outlet connection 37. The inlet and outlet connections are preferably provided with seats 38 for the reception of pipes to be welded directly to the valve body. The valve body is provided with a valve seat arrangement 39 which may be and preferably is of the general type shown in my patent, No. 2,117,044, dated May 10, 1938, wherein is disclosed a seat adapter ring of hard metal welded in the seat ring passage of the valve and provided with a renewable seat ring. A valve member 40 coacts with the seat ring and the valve and its seat at their cooperating surfaces are preferably "stellited" so as to resist the cutting action of the high pressure water or steam. The valve preferably includes a lower guide stem 41 fitting in a guide 42 in the valve body. A closure cap 43 is screw threaded or welded to the valve body. The valve above the seat preferably carries a hard metal deflector head 44 so as to deflect the stream of fluid passing the valve seat and prevent cutting of the valve body. In the form shown the deflector head 44 is screw threaded to the valve proper and further secured thereon by means of a key or pin 45.

The valve body is flanged at 46 and a valve bonnet 47 has a cooperating flange, and bolts 48 extending through holes in the flanges secure the bonnet onto the valve body through the medium of the nuts 49—49 threaded on the bolts 48. A suitable gasket 50 may be interposed between a part of the bonnet and valve body as shown. The valve bonnet has a sleeve 51 projecting down into the valve body and a valve stem guide 52 is secured in the sleeve 51 in fluid-tight engagement therewith. In the form illustrated, the upper end 53 of the valve proper and the lower end of the guide 52 at the point 54 are ground so as to form a fluid-tight joint when the valve is in wide open position and thus relieve the valve stem sealing means of the burden of sealing the valve when in wide open position.

In the preferred form, the valve bonnet 47 has an upstanding sleeve 55 provided with heat radiating fins 56 and is provided with a further valve stem guide 57 rigidly secured therein. The upper end of the guide 57 may be counterbored to receive fibrous or other packing 58 to be compressed through the medium of a gland 59, as will be understood. A valve stem 60 is secured to the valve proper, as by means of the pin 45, and extends upwardly through the guides 52—57 and through the packing 58 and gland 59. The guides 52—57 and portions of the valve stem passing therethrough form labyrinth type of packings, in the present instance formed by means of a plurality of grooves 61 turned in the valve stem. The two labyrinth packings, as will be seen from the drawing, are separated from each other so as to provide a chamber 62 provided with a fluid drain-off connection 63. Thus, any fluid leaking past the lower labyrinth packing may be drained off through the drain connection 63 and the upper labyrinth and fibrous packing 58 serve as a seal for only such liquids or gases as cannot be adequately disposed of through the drain-off connection 63.

The connecting bolts 48—48 extend upwardly beyond the bonnet and at the tops carry a diaphragm chamber designated generally 64. The diaphragm chamber carries a diaphragm 65 and the chamber has an upper fluid pressure connection 66 to admit fluid pressure for urging the diaphragm 65 downwardly, all as will be understood. The connecting bolts 48—48 serve as guides for a cross-head 67 which by means of a dowel 68 is connected to the diaphragm so that the latter may move the cross-head downwardly, as will be clear. The cross-head is urged upwardly by means of springs 69—69 guided on the bolts 48 and engaging the under-surface of the slidable cross-head. The lower ends of the springs are supported by pressure plates 70 held in various positions of adjustment by nuts 71 on the bolts 48. Thus, by properly positioning the nuts 71, the stress upon the springs 69 may be varied. The valve stem 60 is connected to the cross-head 67, preferably by means of an adapter 72 enclosing the upper end of the valve stem 60 and pinned thereto at 73. The adapter may have a T-head 74 fitting a T-slot in the underside of the cross-head 67. The valve as described is adapted to be fluid pressure actuated in one direction, that is, the closing direction in the form illustrated in the drawing, and is actuated in the opening direction by means of the spring 69 and connections heretofore noted. The valve may be readily adjusted to close at any desired pressure above the diaphragm 65. Due to the heavy steel construction of the valve body in its preferred form, great fluid pressures may be carried, and due to the valve and seat arrangement likelihood of cutting the valve, the seat, or the valve body, will be reduced to a minimum. The valve when in open position is self-sealing and when the valve is in an intermediate position, the labyrinth and fibrous packings combined with the drain-off connection between two of the packings serve to adequately protect the valve against valve stem leakage.

While the invention has been described in considerable detail and one preferred form shown, it is to be understood that many changes and modifications may be made within the scope of the invention as defined in the appended claims.

I claim:

1. In a high pressure valve, a valve body having a valve seat therein, a valve member for coaction with said seat, a valve bonnet having a flanged connection with said valve body and having valve stem guide means therein, a valve stem secured to said valve member and guided in said guide means, said guide means and valve stem having a pair of spaced apart labyrinth packings therebetween, a drain-off connection between said labyrinth packings, bolt members connecting said valve bonnet and valve body, said bolt members carrying a diaphragm chamber, a diaphragm in said diaphragm chamber, connecting means including a cross-head guided on said connecting bolts for connecting said diaphragm and valve stem, spring means for urging said cross-head and valve stem in one direction against the action of said diaphragm.

2. A fluid pressure actuated high pressure valve comprising a valve body having a valve seat, a valve member for coaction therewith, a valve bonnet having a flanged connection with said valve body, said bonnet having guide means for a valve stem, a valve stem connected to said valve member and guided in said guide means, spaced apart labyrinth packings between said valve stem and guide means, a drain-off connection between said labyrinth packings, a gland packing at one side of both said labyrinth packings, heat radiating fins on said valve bonnet, connecting bolts for securing said valve body and valve bonnet to each other, a diaphragm chamber member carried by said connecting bolts, a cross-head carried by said connecting bolts, said cross-head and valve stem being connected to each other, springs guided by said connecting bolts and urging said cross-head to move said valve in one direction, connecting means between said cross-head and diaphragm to move said valve under the influence of said diaphragm in the opposite direction, and means for leading pressure fluid to one side of said diaphragm.

PAULSEN SPENCE.